United States Patent
Sharawi et al.

(10) Patent No.: US 8,612,726 B2
(45) Date of Patent: Dec. 17, 2013

(54) MULTI-CYCLE PROGRAMMABLE PROCESSOR WITH FSM IMPLEMENTED CONTROLLER SELECTIVELY ALTERING FUNCTIONAL UNITS DATAPATHS BASED ON INSTRUCTION TYPE

(75) Inventors: Mohammad S. Sharawi, Dhahran (SA); Muhammad Omer, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 534 days.

(21) Appl. No.: 12/962,441

(22) Filed: Dec. 7, 2010

(65) Prior Publication Data

US 2012/0144160 A1   Jun. 7, 2012

(51) Int. Cl.
   *G06F 9/30* (2006.01)
(52) U.S. Cl.
   USPC .............................. 712/32; 712/37
(58) Field of Classification Search
   None
   See application file for complete search history.

(56) References Cited

U.S. PATENT DOCUMENTS

| | | | |
|---|---|---|---|
| 5,933,651 A * | 8/1999 | Masuda et al. | 712/42 |
| 5,983,338 A | 11/1999 | Moyer et al. | |
| 6,775,760 B1 | 8/2004 | Shigeki | |
| 6,963,966 B1 | 11/2005 | Carrillo | |
| 7,679,398 B2 | 3/2010 | Osann, Jr. | |
| 2005/0289326 A1 * | 12/2005 | Lea | 712/218 |
| 2008/0263334 A1 | 10/2008 | Synder et al. | |

* cited by examiner

*Primary Examiner* — Kenneth Kim
(74) *Attorney, Agent, or Firm* — Richard C. Litman

(57) ABSTRACT

The multi-cycle programmable processor emulates the features of a conventional microprocessor. Processor hardware functional units include a program counter (instruction pointer), an arithmetic and logic unit, an accumulator, an instruction register, a 2×1 multiplexer, 2×4 decoder, 1×2 decoder, an AND gate and an OR gate. Additionally, a controller modeled by a finite state machine (FSM) is operably connected to the microprocessor functional units and has a plurality of states that defines the operation of the microprocessor functional units. Each control state of the FSM implements the transfer of information between the registers of the datapath. The execution sequences through three states: an instruction fetch; an instruction decode; and instruction execute. The controller issues the required signals to the various hardware components to execute the instruction needed in three clock cycles.

3 Claims, 7 Drawing Sheets

| INSTRUCTION | SYNTAX | OPERATION PERFORMED | OPCODE VALUE |
|---|---|---|---|
| ADD | [opcode\|address] | AC ← AC + M[AD] | 00 |
| SUB | [opcode\|address] | AC ← AC + M[AD] | 01 |
| MUL | [opcode\|address] | AC ← AC * M[AD] | 02 |
| DIV | [opcode\|address] | AC ← AC / M[AD] | 03 |
| STORE | [opcode\|address] | M[AD] ← AC | 04 |
| LOAD | [opcode\|address] | AC ← M[AD] | 05 |
| JUMP | [opcode\|offset] | PC ← AD | 06 |
| JNEG | [opcode\|offset] | If AC < 0, PC ← AD | 07 |

MULTI-CYCLE PROGRAMMABLE PROCESSOR WITH FSM IMPLEMENTED CONTROLLER SELECTIVELY ALTERING FUNCTIONAL UNITS DATAPATHS BASED ON INSTRUCTION TYPE

BACKGROUND OF THE INVENTION

1. Field of the Invention

The present invention relates to microprocessor programmable architectures, and particularly to a multi-cycle programmable processor.

2. Description of the Related Art

A microprocessor is the core of all computing devices. It is a programmable, clock-driven, and register-based device that collects data from a source, figures out the information, performs calculations, and at the end, produces the desired results. The final results can then be output to an output peripheral device or stored in local or external memory. Processors are created from integrated circuits (IC) that incorporate most or all of the functions of a central processing unit (CPU) that is needed in any computing device. Processors are nowadays used in almost all electrical and electronics equipment.

Embedded systems rely on special purpose digital processors to perform their specialized task. In the realm of real-time signal processing and mobile embedded systems, clock delays and the corresponding power dissipation associated with longer clock periods are becoming the bottlenecks for such systems and are slowing them down from performing quick real-time computations.

To overcome this bottleneck, multi-cycle operation within processors was introduced. The time period of a clock can be significantly reduced in this implementation compared to single cycle implementation, which, in turn, will speed up the processing time. Such an implementation restricts each clock cycle to use only one major functional unit, while at the end of every clock cycle the intermediate results are stored in 'internal' registers for use in later cycles.

Multi-cycle operation signifies that each instruction in the processors will take several clock cycles to execute. The basic idea is to break down the long cycle into multiple shorter cycles. The time period of a clock can be significantly reduced in comparison with single cycle implementation, which, in turn, will speed up the processing time. In addition, a multiple-cycle implementation restricts each clock cycle to use only one major functional unit. At the end of every clock cycle, the intermediate results are stored in 'internal' registers for use in later cycles.

Generally speaking, a microprocessor executes each of its instructions in an instruction fetch stage, an instruction decode stage, an execute stage, a memory access stage, and a write-back stage, each stage being executable in one clock cycle of the microprocessor to provide for a 5-cycles per instruction throughput. The typical MIPS processor utilizes a computer architecture that allows for pipelining without interlocking stages to improve performance over the aforementioned 5-cycle per instruction. This performance improvement varies according to instruction type.

For example, a typical MIPS microprocessor executes a Load instruction in 5 cycles, a Store instruction in 4 cycles, an R-type instruction in 4 cycles, a Branch instruction in 3 cycles, and a Jump instruction in 3 cycles. Thus, the performance improvement is based on the mix of instruction types found in the computer application at hand. As the mix of instructions varies considerably based upon the type of processing application being run, it would be desirable to decouple the performance improvement from the mix of instructions in the program being executed.

Thus, a multi-cycle programmable processor solving the aforementioned problems is desired.

SUMMARY OF THE INVENTION

The multi-cycle programmable processor includes microprocessor functional units that can be custom-programmed into a Field Programmable Gate Array, (FPGA), a Programmable Logic Device (PLD), or the like. Microprocessor functional units such as an instruction register (IR), a memory module (M), a pair of 2×1 multiplexers (MUXs), a program counter (PC), an arithmetic-logic unit (ALU), a register-accumulator (REGAC), and a 1×2 decoder are connected to a controller, which selectively controls the datapath responsive to type of instruction to be executed. This selective datapath control enables all instruction types to execute in only 3 clock cycles.

These and other features of the present invention will become readily apparent upon further review of the following specification and drawings.

BRIEF DESCRIPTION OF THE DRAWINGS

FIG. 2 is a table showing an instruction set for a multi-cycle programmable processor according to the present invention.

FIG. 5 is a waveform diagram showing instruction timing for a multi-cycle programmable processor according to the present invention for a test program implementing a test function.

Similar reference characters denote corresponding features consistently throughout the attached drawings.

DETAILED DESCRIPTION OF THE PREFERRED EMBODIMENTS

Figure 1:
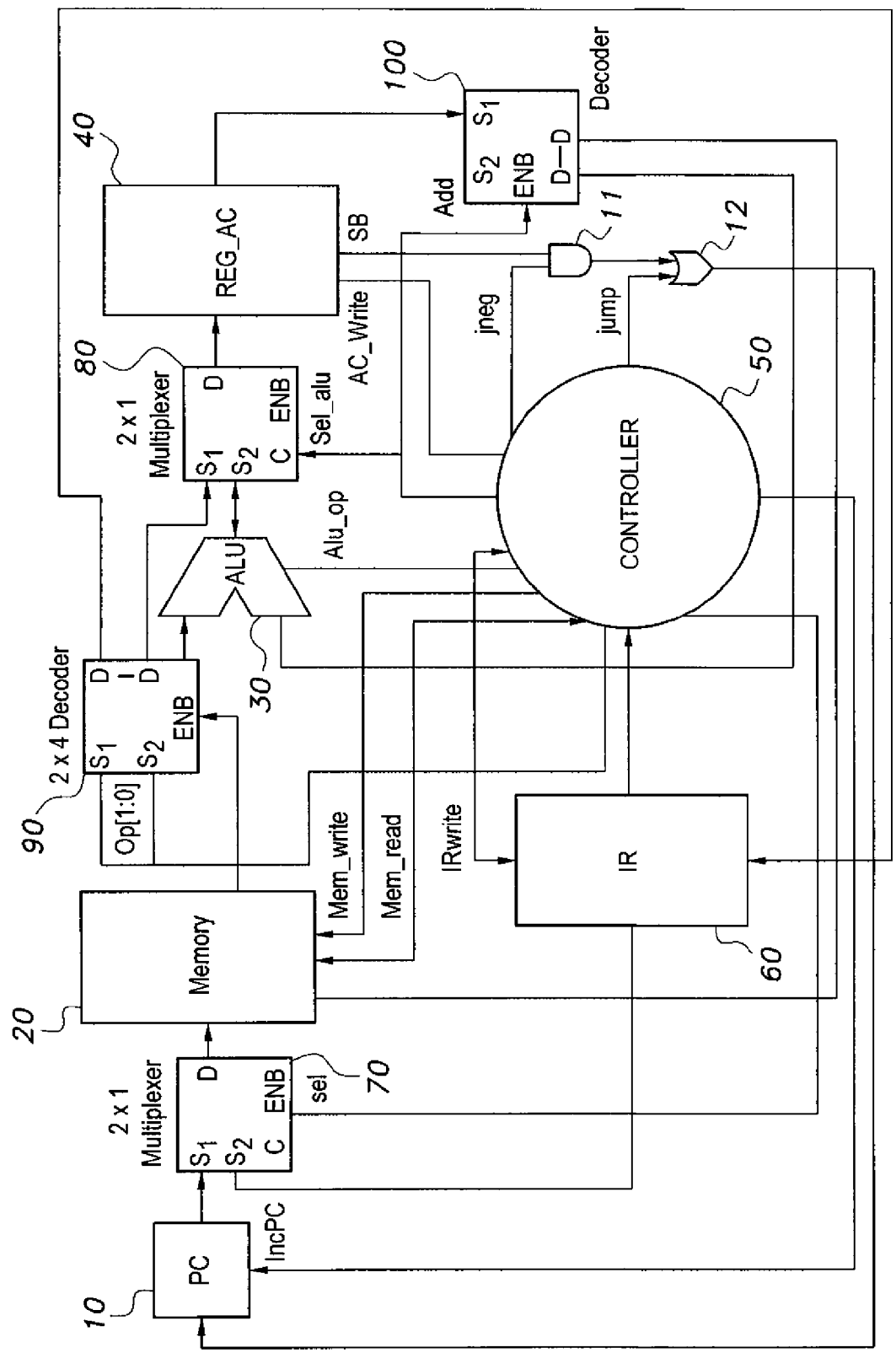
FIG. 1 is a schematic diagram of the multi-cycle programmable processor according to the present invention.
Figure 3:
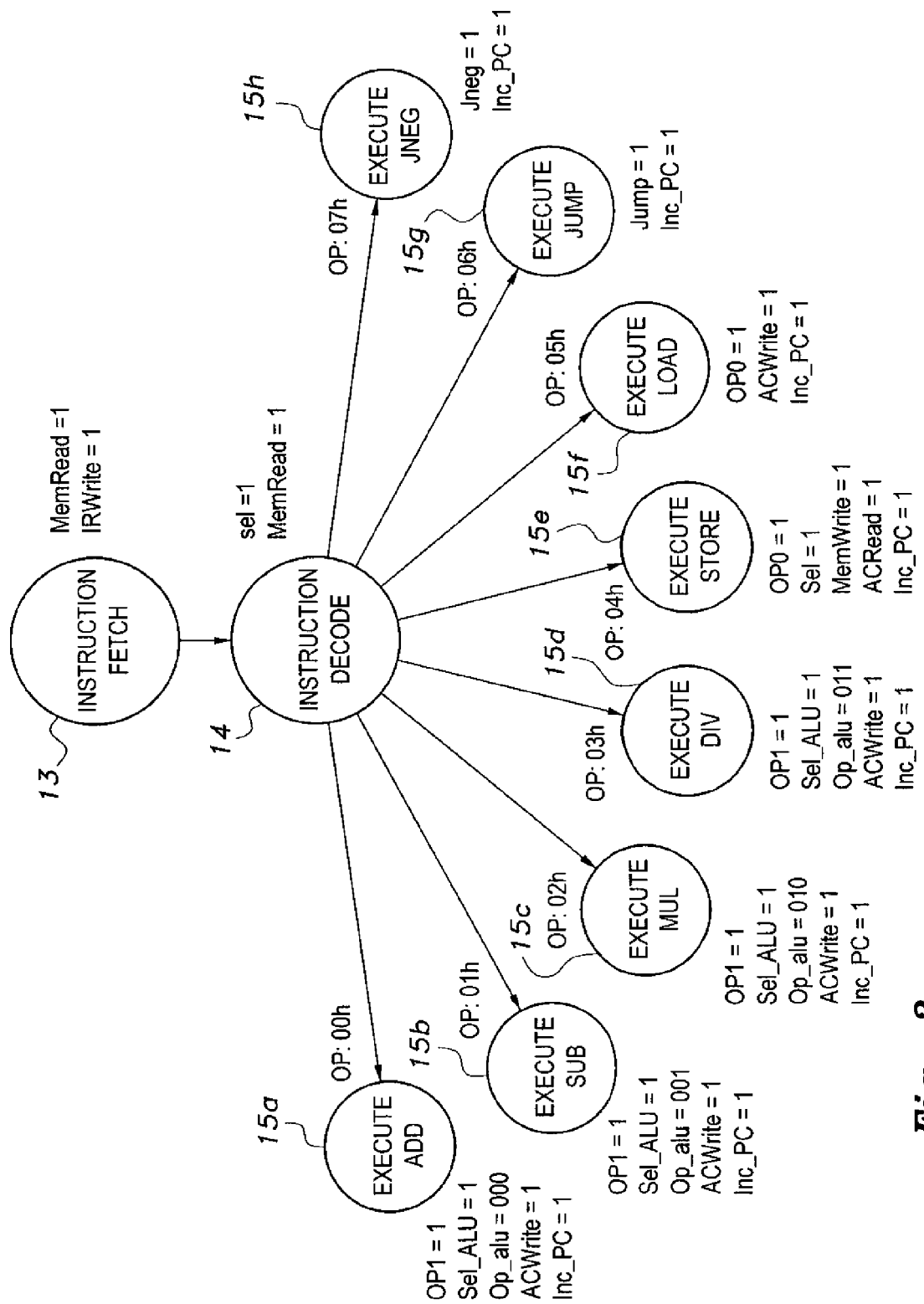
FIG. 3 is a block diagram showing the states required to execute the various instruction types of a multi-cycle programmable processor according to the present invention.

As shown in FIGS. 1 and 3, the multi-cycle programmable processor is a design and architecture for a multi-cycle programmable processor that can used in real-time applications and embedded systems. The architecture is programmable and can be modified according to the application at hand. The programs can be modified via a hardware description language (HDL). Moreover, low complexity is achieved because the architecture is simple and only uses a 16-bit instruction format. The hardware components of the datapath only consume a small portion of a programmable logic device (PLD), leaving more room for complicated programs.

Since the architecture is realized in a hardware description language (HDL), it can be glued in modular fashion with more added functionality based on the needs of the application. Additionally, because of its programmability, this architecture can have an expanded instruction set, and any number of instructions can be introduced with minimal modifications.

All the implemented instructions consume 3 clock cycles to execute. This improves speed, and thus overall system performance compared to a regular MIPS (Microprocessor without Interlocked Pipeline Stages) processor, where each instruction type has a different number of clock cycles for its execution.

Using the hardware description language (HDL) and taking into account timing and resource utilization performance parameters allows for synthesis of the processor architecture, as well as subsequent testing of the processor architecture on different programmable logic device (PLD) platforms.

The multi-cycle programmable processor emulates standard microprocessor functional units. The multi-cycle programmable processor is built with several modules. These modules are developed using Verilog® HDL (Hardware Descriptive Language). Most of the modules, excluding the controller 50, perform datapath operations, i.e., they read the input data (input address) from a data bus (address bus), and, depending upon the control signals, they forward that data to an output bus. These modules have input and output ports, along with registers to retain their contents. The datapath and controller 50 of the multi-cycle programmable processor are shown in FIG. 1. The state diagram shown in FIG. 3 details the operational stages of the architecture 5. When the number of cycles is limited to three, the multi-cycle programmable processor is referred to herein as a programmable triple-cycle embedded processor (PTEP).

FIG. 1 shows a schematic diagram of an exemplary multi-cycle programmable processor. The main hardware components of the multi-cycle programmable processor are: a Program Counter 10, Main Memory 20, an Arithmetic and Logic Unit 30, an Accumulator 40, the Controller 50, an Instruction Register 60, a 2×1 Multiplexer 70, a 2×4 Decoder 80, a 1×2 Decoder 100, an AND gate 11, and an OR gate 12. The program counter (PC) 10 (also called the instruction pointer) is a register that points to the current instruction that has to be executed in a computer program. Inputs to the PC 10 are the controlling signals and the offset value (in case of a JUMP instruction). The PC 10 outputs an 8-bit address. The main memory (or Primary storage) 20 is the location where the program instructions and data to be processed are stored.

The processor continuously reads the instructions stored in the main memory 20 and executes them, as required. The processed data can also be stored in main memory 20. Each instruction in the instruction register 60 is 16-bit length. The first eight most significant bits (MSBs) specify the type of the instruction, i.e., the operation code (abbreviated as op-code). The remaining least significant bits (LSBs) contain the address of the data inside the data memory 20. An arithmetic and logic unit (ALU) 30 is a digital circuit that performs arithmetic and logical operations. The ALU 30 is a fundamental building block of any microprocessor. The input to the ALU 30 comes from the data memory 20, which provides one of the operands, while the second input comes from the accumulator register 40. External controller 50 directs the ALU 30 to perform specific operations on the operands according to the op-code used (e.g., add, subtract, and the like). The output of the ALU 30 is written back into the accumulator register 40.

The result can then be transferred to the data memory 20 if it is not used immediately in the following instructions. Otherwise, it is instantly available to the ALU for being processed further. An accumulator (AC) 40 is a register in which intermediate arithmetic and logic results are stored. In the absence of an AC 40, the results of arithmetic calculation (addition, multiplication, etc.) would have to be written back to the main memory 20. The process of writing the results to the main memory would be slower than writing them to the register (accumulator) because the technology used for the large main memory is slower than that used for the register. The AC 40 is initially set to zero. After the required operations are complete, the AC 40 will hold the final answer, and then it can be stored in main memory 20. The controller 50 is a finite state machine (FSM). There are various states during the operation of a microprocessor for which a control unit has to generate specific signals.

Each control state implements the transfer of information between the registers of the datapath. The execution sequence will go through three states: an instruction fetch, an instruction decode, and an instruction execute. The controller 50 issues the required signals to the various hardware components to execute the instruction needed. The instruction register (IR) 60 stores the instruction currently being decoded. Each instruction to be executed is loaded into the IR 60, which holds it while it is decoded, prepared, and ultimately executed. Decoding the op-code includes determining the instruction, determining where its operands are in memory, retrieving the operands from memory, and allocating processor resources to execute the command. The 2×1 multiplexers 70, 80 and multiplex signals coming from the IR 60 and the PC 10 to the first multiplexer 70, and from the ALU 30 and the memory decoder 90 modules to the second multiplexer, respectively, are routed to a single module memory 20 and a single module AC 40, respectively. The first multiplexer 70 provides data coming from the program counter 10 and the instruction register 60 to the memory 20. The second multiplexer 80 multiplexes incoming data from the arithmetic and logical unit 30 and the memory 20 (via the decoder 90) to the accumulator 40. The decoders 90 and 100 are used to connect the output of a single module to multiple modules. The 2×4 decoder 90 decodes data coming from the main memory 20 to the instruction register 60, to the arithmetic and logical unit 30, and to the accumulator 40. The one-by-two decoder 100 selects the target module for the data of the accumulator register 40. It is either written to the main memory 20 or to the instruction register 60.

The processor architecture implements eight basic instructions, and can be extended to include much more due to its programmability. Table 200 of FIG. 2 shows the list of instructions used in the embodiment described herein. The list of instructions can be extended based on user requirements. This is a major feature of the processor architecture.

Each instruction has 16 bits. The most significant 8-bits of the instruction contain the op-code. The least significant 8-bits of each instruction contain a memory address field. Depending on the op-code, this address may point to a data location or the location of another instruction.

The multi-cycle programmable processor reads an instruction from memory 20, decodes the instruction to determine what operations are required, and then executes the instruction. A simple state machine, i.e., the controller 50, controls this sequence of operations in the processor. The controller 50 assigns a single state to each operation stage of the multi-cycle programmable processor, as shown in the state machine diagram of FIG. 3. The states are named according to the operation performed within that state, e.g., instruction fetch state (IF) 13, instruction decode state (ID) 14, and instruction execute (IE) 15. The instruction execute state 15 is sub-divided into execute_add 15a, execute_sub 15b, execute_mul 15c, execute_div 15d, execute_store 15e, execute_load 15f, execute_jump 15g, and execute_jneg 15h. These states are implemented by 4-bit instruction register 60. Each state takes a single clock to execute, during which the controller 50 generates appropriate control signals to control the datapath operations.

During the instruction_fetch state 13, the instruction present in the memory 20 corresponding to the value in the program counter 10 should be made available to instruction register 60. This is achieved by reading the memory 20 at the positive edge of the first clock cycle (mem_read control signal is asserted) and writing instruction register 60 during the negative edge of the same cycle (IR_write control signal is asserted). In the instruction_decode state 14, the fetched instruction from the previous state is analyzed to determine which type of instruction has to be executed in the cycles to follow. For this reason, the op-code of the instruction is fed into the controller 50, and the data from memory 20 corresponding to the address provided by the least significant bits of the instruction is read (mem_read is asserted). This data is either a constant operand (offset) required by arithmetic (jump) instructions, or it is an address (pointing to data memory) used by load (store) instructions. Finally, in the instruction_execution state (any of sub states 15a through 15h), the data and the control lines corresponding to the instruction to be executed are available, and the stage is set for the following processes to take place.

In the execute_arithmetic state, (any of sub states 15a, 15b, 15c, or 15d), the ALU 30 performs arithmetic operation on two operands. The first operand comes from the data memory 20, while the value stored in the accumulator 40 is made available as the second input of the ALU 30. Three-bit control signal op_alu determines the arithmetic operation (Addition, Subtraction, Multiplication, and Division) to be performed on the operands. The content of the accumulator 40 is updated with the result of the calculation. The control signals Sel_alu, ACWrite, Op_alu are set to execute the aforementioned datapath operation, followed by asserting Inc_PC, which causes the program counter 10 to be updated with the address of the next instruction.

During execute_store state 15e, the data from the accumulator 40 can be stored in data memory 20, if one needs to use them anywhere in the program. The controller 50 sets the control signals ACRead, MemWrite to execute the above mentioned datapath operation, followed by asserting Inc_PC, which causes the program counter 10 to be updated with the address of the next instruction. In execute_load state 15f, the accumulator 40 is loaded with the data fetched from the data memory 20. This data can be used as one of the operands for arithmetic instructions. The control signal ACWrite is asserted, which copies the data from data memory 20 to the accumulator 40. Inc_PC is set, which causes the program counter 10 to be updated with the address of the next instruction.

For execute_jump state 15g, the Jump control line, along with sel, is set, which copies the offset address (least 8 significant bits of Jump Instruction) to the program counter 10. In case of execute_jump_if_negative 15h, the jneg control signal is asserted. Furthermore, the most significant bit of the accumulator 40 is checked and is logically ANDed with Jneg via AND gate 11. If MSB=1 then the next instruction is fetched from the address provided by the offset portion of the instruction. For both types of jump instruction, Inc_PC is set, which causes the program counter 10 to be updated with the address of the next instruction.

Figure 4:
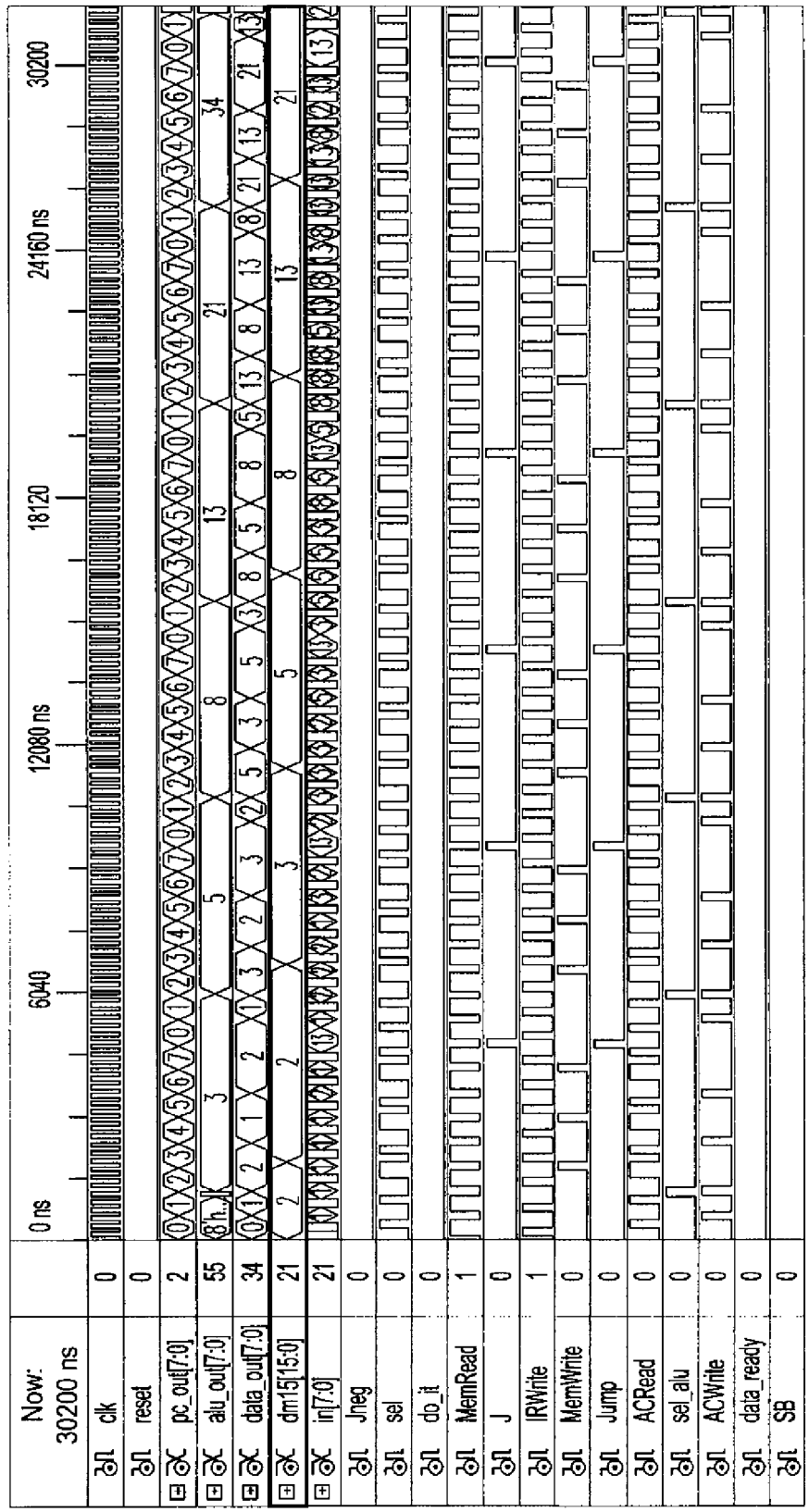
FIG. 4 is a waveform diagram showing the instruction timing for a multi-cycle programmable processor according to the present invention for a test program implementing a Fibonacci series.
Figure 5:
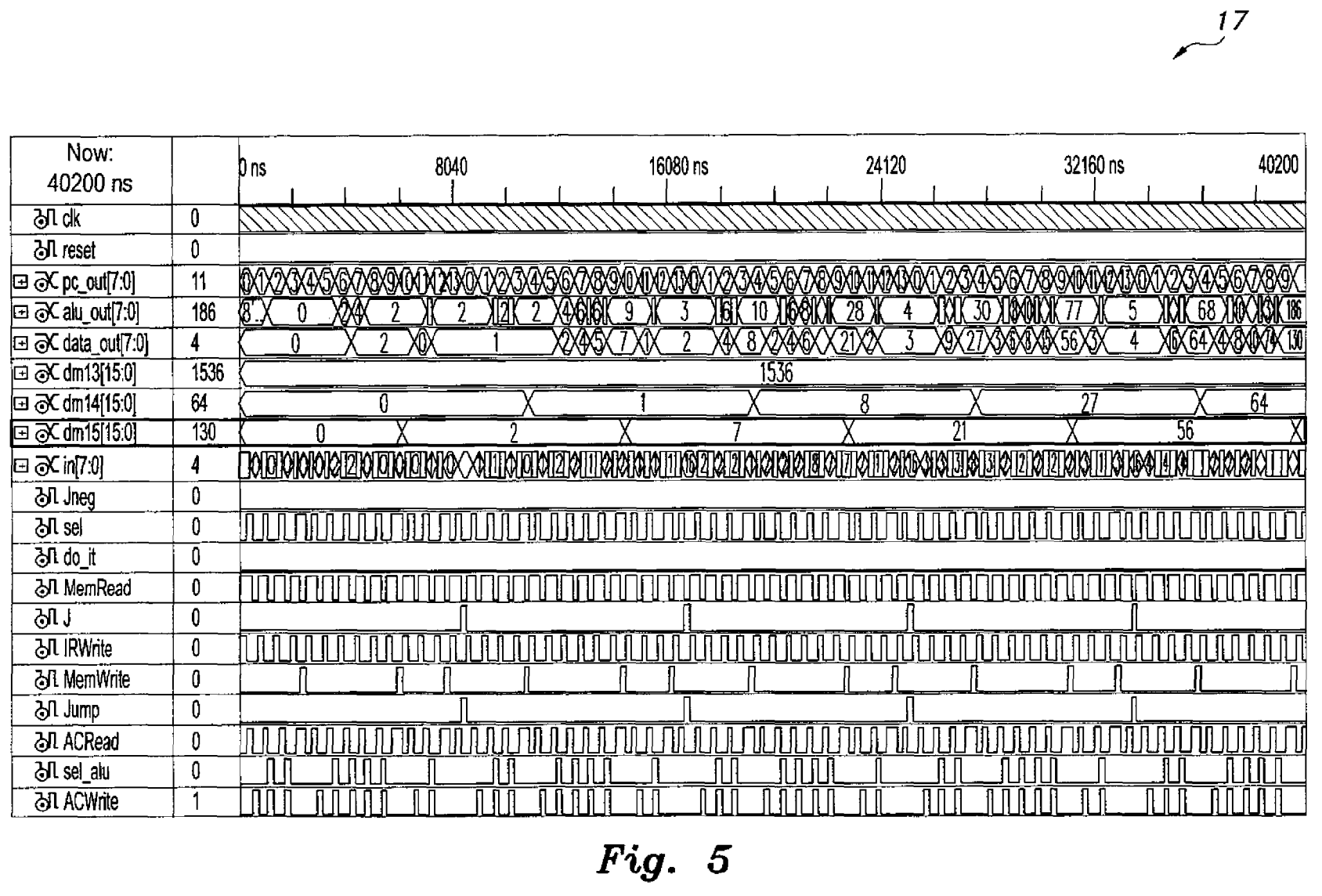

Timing diagrams 16 and 17 of FIGS. 4 and 5, respectively, show the simulation outputs of the multi-cycle programmable processor implemented on a PLD platform to verify the correct functionality of the architecture. The output is highlighted with a bold rectangle. The timing diagram 16 of FIG. 4 shows the output of an implemented program that generates a test sequence that is well known in the literature, called the Fibonacci Series. Moreover, the timing diagram 17 of FIG. 5 shows the results of a program executed on the architecture to implement the function:

$$y = \sum_{0}^{n} k^3 + 2k + 2 \qquad (1)$$

Figure 6:
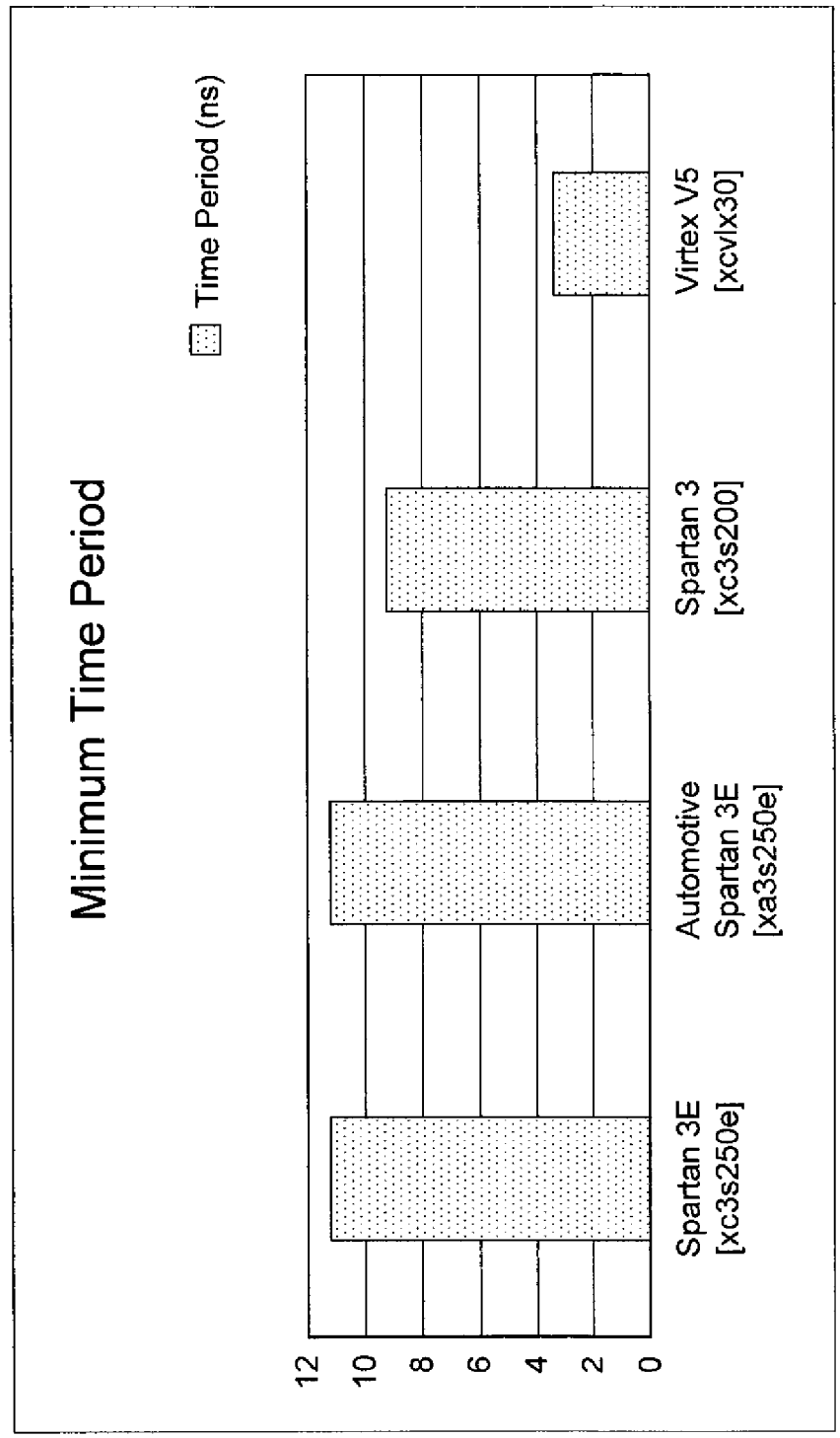
FIG. 6 is a bar graph showing the implementation results for the delays per nanosecond per instruction for a multi-cycle programmable processor according to the present invention.
Figure 7:
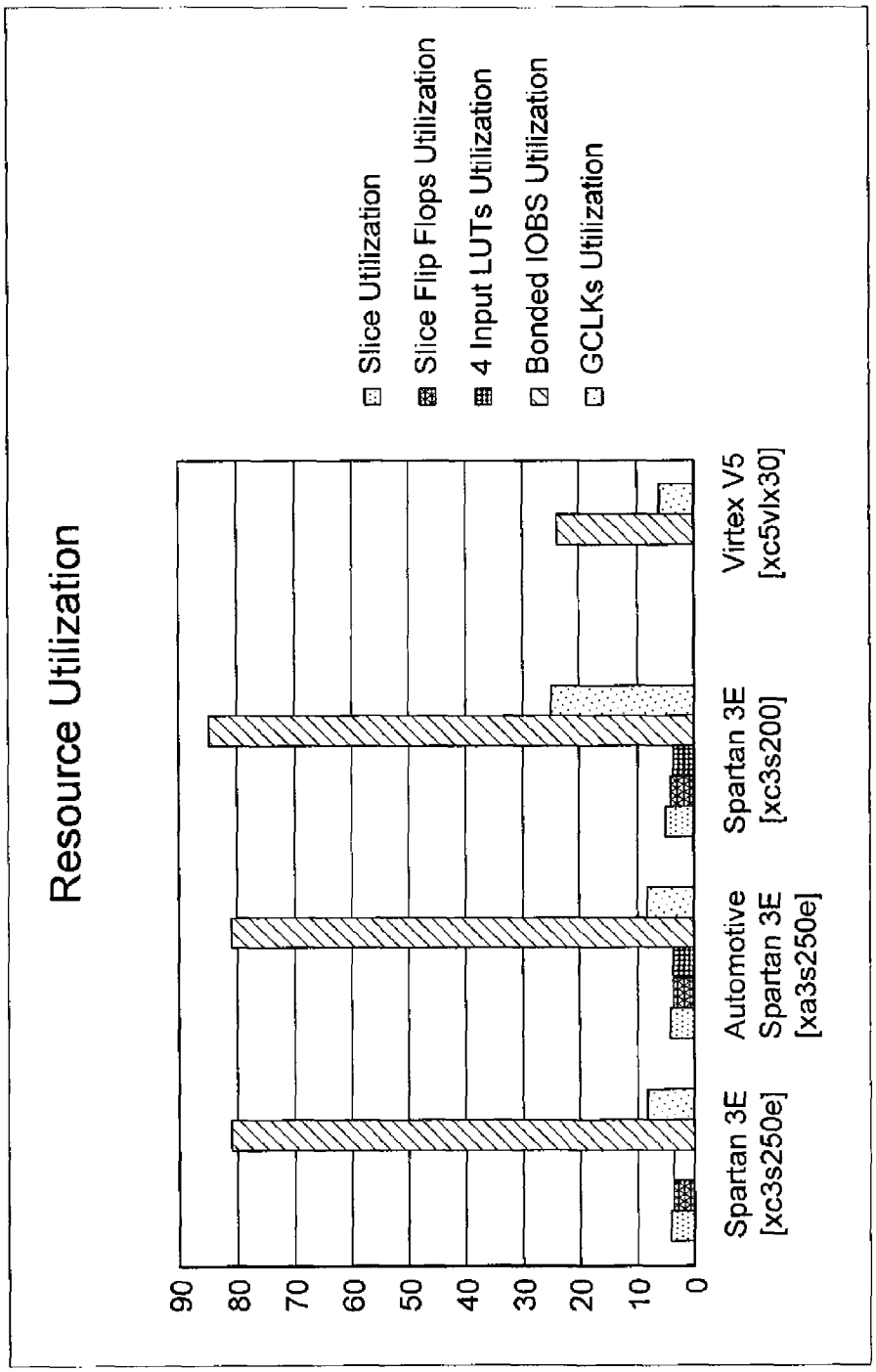
FIG. 7 is a bar graph showing resources occupied on the PLD platforms of the multi-cycle programmable processor according to the present invention.

The bar graph 18 of FIG. 6 shows implementation results for the delays per nanosecond per instruction. Basically, the amount of delay an instruction needs to execute determines the speed of the program execution. The delay per instruction bar graph 18 was obtained from the program that implements the aforementioned equation (1), The bar graph 19 of FIG. 7 shows the resources occupied on the PLD platforms 19. The number of resources utilized on the PLD signifies the size of the implemented area on a PLD, and thus the complexity of the design, as well as how much room is left for storing larger programs in the PLD memory.

It is to be understood that the present invention is not limited to the embodiments described above, but encompasses any and all embodiments within the scope of the following claims.

We claim:

1. A multi-cycle programmable processor, comprising:
a plurality of microprocessor functional units and datapaths interconnecting the microprocessor functional units to form a functional unit electronic circuit to perform instruction execution of a plurality of instruction types, wherein each said instruction has 16 bits comprising a first bit set of 8 bits specifying an instruction type and a second bit set of 8 bits specifying a data address, said microprocessor functional units comprising:
an Instruction Register;
a memory multiplexer;
an accumulator multiplexer;
an arithmetic logic unit (ALU);
an address decoder;
an accumulator;
a memory;
an instruction decoder; and
a program counter interoperably connected in said functional unit electronic circuit to perform microprocessing functions; and
a programmable controller having a control electronic circuit connected to the functional unit electronic circuit of the microprocessor functional units, the programmable controller selectively altering the datapaths based on a specific instruction type of the plurality of instruction types being executed by the microprocessor functional units, the selective altering of the datapaths limiting clock cycles per instruction (CPI) to a predetermined CPI, wherein said control electronic circuit comprises:
a first bidirectional control connection interconnecting said control electronic circuit and an IR write port of said Instruction Register;
an Instruction Register input connection interconnecting an output of said Instruction Register to an input of said control electronic circuit;
a second bidirectional control connection interconnecting said control electronic circuit and a memory read input of said memory;

an output control connection interconnecting said control electronic circuit and a memory write input of said memory;

an ALU control connection interconnecting said control electronic circuit and an ALU_OP input of said ALU;

a select ALU control connection interconnecting said control electronic circuit and a select ALU input of said ALU multiplexer;

an instruction register decoder control connection interconnecting said control electronic circuit and instruction register data select inputs of said instruction register decoder;

an address decoder control connection interconnecting said control electronic circuit and an enable input of said address decoder;

a first program counter control connection interconnecting said control electronic circuit and an IncPC (increment program counter) input of said program counter;

a second program counter control connection interconnecting said control electronic circuit and a program counter jump input of said program counter;

a select memory control connection interconnecting said control electronic circuit and a select input of said memory multiplexer; and an accumulator control connection interconnecting said control electronic circuit and a AC_Write input of said accumulator.

2. The multi-cycle programmable processor according to claim 1, wherein said predetermined CPI is three clock cycles per instruction.

3. The multi-cycle programmable processor according to claim 1, wherein said plurality of instruction types include add, subtract, multiply, divide, store, load, jump, and jump negative instruction types.

* * * * *